United States Patent
Ordille et al.

(10) Patent No.: US 8,102,974 B2
(45) Date of Patent: Jan. 24, 2012

(54) METHOD AND APPARATUS FOR EVENT NOTIFICATION BASED ON THE IDENTITY OF A CALLING PARTY

(75) Inventors: Joann J. Ordille, South Orange, NJ (US); Patrick Tendick, Basking Ridge, NJ (US)

(73) Assignee: Avaya Inc., Basking Ridge, NJ (US)

(*) Notice: Subject to any disclaimer, the term of this patent is extended or adjusted under 35 U.S.C. 154(b) by 438 days.

(21) Appl. No.: 10/611,503

(22) Filed: Jul. 1, 2003

(65) Prior Publication Data

US 2005/0002499 A1 Jan. 6, 2005

(51) Int. Cl.
*H04M 1/64* (2006.01)
*H04M 11/04* (2006.01)

(52) U.S. Cl. ............ 379/88.12; 379/45; 379/88.11

(58) Field of Classification Search ............. 379/45, 379/88.12, 88.22
See application file for complete search history.

(56) References Cited

U.S. PATENT DOCUMENTS

| | | | |
|---|---|---|---|
| 5,559,867 A | 9/1996 | Langsenkamp et al. | |
| 5,912,947 A | 6/1999 | Langsenkamp et al. | |
| 5,946,386 A * | 8/1999 | Rogers et al. | 379/265.09 |
| 6,026,153 A * | 2/2000 | Fuller et al. | 379/200 |
| 6,201,856 B1 * | 3/2001 | Orwick et al. | 379/40 |
| 6,226,360 B1 * | 5/2001 | Goldberg et al. | 379/69 |
| 6,404,880 B1 * | 6/2002 | Stevens | 379/221.11 |
| 6,427,001 B1 * | 7/2002 | Contractor et al. | 379/45 |
| 6,463,462 B1 | 10/2002 | Smith et al. | |
| 6,480,578 B1 * | 11/2002 | Allport | 379/48 |
| 6,507,817 B1 * | 1/2003 | Wolfe et al. | 704/260 |
| 6,578,000 B1 * | 6/2003 | Dodrill et al. | 704/270 |
| 6,816,878 B1 * | 11/2004 | Zimmers et al. | 709/200 |
| 7,049,971 B2 * | 5/2006 | Guillory | 340/601 |
| 7,084,775 B1 * | 8/2006 | Smith | 340/601 |
| 7,133,869 B2 * | 11/2006 | Bryan et al. | 1/1 |
| 7,216,145 B2 * | 5/2007 | Collings, III | 709/206 |
| 7,228,331 B2 * | 6/2007 | Wang | 709/203 |
| 7,283,045 B1 * | 10/2007 | Manz | 340/506 |
| 7,305,448 B2 * | 12/2007 | Go | 709/207 |
| 7,346,662 B2 * | 3/2008 | Koch et al. | 709/206 |
| 7,359,493 B1 * | 4/2008 | Wang et al. | 379/88.23 |
| 7,418,085 B2 * | 8/2008 | Rodkey et al. | 379/88.12 |
| 7,424,518 B2 * | 9/2008 | Go | 709/207 |
| 7,458,080 B2 * | 11/2008 | Parker et al. | 719/318 |
| 7,469,272 B2 * | 12/2008 | McKee et al. | 709/206 |
| 7,474,892 B2 * | 1/2009 | Skinner et al. | 455/420 |
| 7,496,183 B1 * | 2/2009 | Rodkey et al. | 379/88.12 |
| 7,519,165 B1 * | 4/2009 | Rodkey et al. | 379/88.12 |
| 7,522,038 B2 * | 4/2009 | Edwards et al. | 340/539.1 |
| 7,529,850 B2 * | 5/2009 | Verma et al. | 709/242 |

(Continued)

*Primary Examiner* — Joseph T Phan
(74) *Attorney, Agent, or Firm* — Maldjian Law Group LLC; John P. Maldjian, Esq.

(57) ABSTRACT

An event notification system notifies one or more designated persons of an event or emergency that has been reported by an endpoint to a receiver. When a call is received by the receiver, an event notification process identifies the endpoint. One or more designated persons are identified that should be notified when a call is received from this endpoint. The notification message that is generated and optionally the particular designees that are notified can be based on information about the call. The event notification may be triggered by a received call. The designated persons can be notified by an event notification system using a communication flow expression according to the delivery preferences of each designated person. The disclosed event notification system optionally obtains the responses of the designees, and records the status of the notification process.

21 Claims, 5 Drawing Sheets

U.S. PATENT DOCUMENTS

| | | |
|---|---|---|
| 7,558,558 B2 * | 7/2009 | Langsenkamp et al. ... 455/404.1 |
| 7,624,171 B1 * | 11/2009 | Rodkey et al. ............ 709/223 |
| 7,664,233 B1 * | 2/2010 | Kirchmeier et al. ......... 379/37 |
| 7,684,548 B1 * | 3/2010 | Rodkey et al. .......... 379/88.12 |
| 7,685,245 B1 * | 3/2010 | Rodkey et al. ............ 709/206 |
| 7,685,265 B1 * | 3/2010 | Nguyen et al. ............ 709/223 |
| 7,769,495 B1 * | 8/2010 | Rodkey et al. ............ 700/286 |
| 7,769,496 B1 * | 8/2010 | Rodkey et al. ............ 700/286 |
| 7,773,729 B2 * | 8/2010 | Rodkey et al. ............. 379/37 |
| 7,808,378 B2 * | 10/2010 | Hayden ..................... 340/506 |
| 7,853,250 B2 * | 12/2010 | Harvey et al. ............. 455/421 |
| 7,869,576 B1 * | 1/2011 | Rodkey et al. ............. 379/37 |
| 7,877,694 B2 * | 1/2011 | Antonelli et al. .......... 715/746 |
| 7,895,263 B1 * | 2/2011 | Kirchmeier et al. ....... 709/203 |
| 7,904,208 B1 * | 3/2011 | Rodkey et al. ............ 700/266 |
| 8,023,621 B2 * | 9/2011 | Hulls ......................... 379/37 |

* cited by examiner

FIG. 3

ENDPOINT NOTIFICATION DATABASE – 300

| ENDPOINT TELEPHONE NUMBER (330) | ENDPOINT ADDRESS (340) | ENDPOINT DESIGNEE LIST (350) |
|---|---|---|
| 222-555-1212 | 112 MAIN STREET; ANYTOWN, USA | JOANN AND NURSE |
|  |  |  |
| 333-554-2121 | 10 CENTER STREET; ANYCITY, USA | CHILDREN |

305 — row 1
310 — row 2
315 — row 3

FIG. 4

DESIGNEE PREFERENCE AND ROLE DATABASE - 400

| RECIPIENT NAME | RECIPIENT TYPE | PERSONAL COMMUNICATION FLOW |
|---|---|---|
| JOANN | PERSON | (CELL RACES EMAIL) DELEGATES JERRY |
| NURSE | ROLE | (SAM BETWEEN 0:800-16:59) OR (SUE BETWEEN 17:00-00:59) OR (GREG BETWEEN 01:00-07:59) DELEGATES NURSE |
| CHILDREN | NAMED COMMUNICATION FLOW | CHRIS AND JERRY AND BENGI AND JENNY |
| ⋮ | ⋮ | ⋮ |
| WEB | CONTACT METHOD | |

430 — RECIPIENT NAME
440 — RECIPIENT TYPE
450 — PERSONAL COMMUNICATION FLOW

405 — JOANN row
410 — NURSE row
415 — CHILDREN row
420 — WEB row

FIG. 5

EVENT IDENTIFIER 500

| | EVENT/STATUS | TIMESTAMP | RECEIPIENT NAME | RESPONSE |
|---|---|---|---|---|
| 505 | 911 CALL FROM RECEIVED FROM 908-555-1234. | 5/14/03 10:14:43 AM | | |
| 510 | CALLER LIZ JOHNSON REPORTS SHORTNESS OF BREATH, DIZZINESS. | 5/14/03 10:14:58 AM | | |
| 515 | POLICE DISPATCHED. | 5/14/03 10:15:12 AM | | |
| 520 | AMBULANCE DISPATCHED. | 5/14/03 10:15:14 AM | | |
| 525 | EVENT NOTIFICATION SYSTEM GENERATES COMMUNICATION FLOW. | 5/14/03 10:15:15 AM | | |
| 530 | EVENT NOTIFICATION PROCESS BEGINS COMMUNICATION FLOW EXECUTION. | 5/14/03 10:15:16 AM | | |
| 535 | EVENT NOTIFICATION PROCESS ATTEMPTS TO NOTIFY RECEIPIENT PAT BY PAGER. | 5/14/03 10:15:20 AM | PAT | |
| 540 | EVENT NOTIFICATION PROCESS ATTEMPTS TO NOTIFY RECEIPIENT JOANN BY CELL PHONE AND E-MAIL. | 5/14/03 10:15:22 AM | JOANN | |
| 545 | POLICE ARRIVE. | 5/14/03 10:17:03 AM | | |
| 550 | RESPONSE | 5/14/03 10:17:36 AM | PAT | ACKNOWLEDGE. WILL AWAIT STATUS. |
| 555 | POLICE REPORT LIZ JOHNSON APPEARS WEAK, BUT VITAL SIGNS APPEAR OK. | 5/14/03 10:18:36 AM | | |
| 560 | AMBULANCE ARRIVES. | 5/14/03 10:23:52 AM | | |
| 565 | AMBULANCE TAKES LIZ JOHNSON TO SOMERSET MEDICAL CENTER (HOSPITAL) FOR OBSERVATION. SHE APPEARS WEAK, BUT IS ABLE TO WALK. | 5/14/03 10:31:40 AM | | |
| 570 | RESPONSE | 5/14/03 10:33:27 AM | JOANN | ACKNOWLEDGE. WILL GO TO HOSPITAL. |

METHOD AND APPARATUS FOR EVENT NOTIFICATION BASED ON THE IDENTITY OF A CALLING PARTY

FIELD OF THE INVENTION

The present invention relates generally to methods and apparatus for communicating with one or more people, and more particularly, to methods and apparatus for automatically notifying one or more interested parties of an event or emergency based on the identity of the calling party.

BACKGROUND OF THE INVENTION

Advances in telecommunication systems have improved the ability of emergency personnel to respond to an emergency. For example, when a caller dials 911 or another emergency telephone number, information about the location of the caller can be automatically provided to the local authorities. 911 calls are typically processed by a Public Safety Answering Point (PSAP) that processes emergency calls and dispatches an appropriate response. The PSAP evaluates an automatic number identifier (ANI) associated with an incoming call to identify the telephone number of the calling party. The ANI can then be used to retrieve information about the location of the calling party from an Automatic Location Identification (ALI) database. The ALI database may provide, for example, the address of the calling party, together with appropriate directions, or a nearest cross street. In this manner, appropriate emergency personnel can be dispatched to the indicated location, even if the calling party is unable to state his or her location.

In addition, recent advances in telecommunication systems permit important messages to be provided to an entire community during an emergency. For example, a number of techniques have been proposed or suggested to automatically inform the public of an emergency situation, or to provide a public service message. Typically, such community notification systems maintain a database containing a telephone number or electronic mail address (or both) of each member of the relevant community. Thereafter, in the event of an emergency affecting the community, a recorded message is sent to each specified telephone number or electronic mail address. For example, U.S. Pat. Nos. 5,559,867 and 5,912,947, assigned to Sigma/Micro Corp., of Indianapolis, Ind., describe a public notification system that automatically initiates telephone calls to telephone numbers identified in a database of users. Similarly, U.S. Pat. No. 6,463,462, assigned to Dialogic Communications Corporation of Franklin, Tenn., describes an automated system for delivering messages to a community of users. For example, if there is an accident at an industrial site in a particular community, a community notification system can automatically call all residents within a certain radius of the site and play a recorded message providing information about the emergency.

While such community notification systems can be effectively employed to notify a large number of people in the event of a catastrophic emergency or another event affecting an entire community, they cannot effectively notify a small group of people that are affected by more routine or personal emergencies. In addition, currently available community notification systems provide the same message to all community members using static contact information, and are unable to tailor the message or the distribution list to characteristics of an incoming emergency call. A need exists for a mechanism for notifying one or more interested parties when a person calls 911 or another telephone number.

SUMMARY OF THE INVENTION

Generally, an event notification system is provided that notifies one or more designated persons of an event or emergency that has been reported by an endpoint to a receiver, such as a Public Safety Answering Point (PSAP) that processes 911 calls or a customer support line. When a call is received by the receiver, an event notification process obtains the telephone number (or electronic mail address) of the endpoint. The telephone number (or electronic mail address) of the endpoint can be used as an index to identify one or more designated persons that should be notified when a call is received from this endpoint. The notification message that is generated and optionally the particular designees that are notified can be based on information about the call, such as the nature of the emergency.

The event notification may be triggered by a received call. Generally, whenever a telephone call is received from an endpoint registered with the event notification system, the corresponding specified designees will be notified of the event. In a further variation, the event notification can be triggered indirectly when a call is placed by a third party identifying the response address associated with an endpoint. For example, if a neighbor reports an emergency at a home across the street, the designees that have been specified for the home across the street should be notified.

The designated persons are notified, for example, by an event notification system using a communication flow expression according to the delivery preferences of each designated person. The disclosed event notification system optionally obtains the responses of the designees, and records the status of the notification process. The communication flow can be specific to the target endpoint and the circumstances of the emergency call. A notification request manager tracks all the notification requests that have been submitted and maintains status information for each request, such as pending, cancelled or completed.

A more complete understanding of the present invention, as well as further features and advantages of the present invention, will be obtained by reference to the following detailed description and drawings.

BRIEF DESCRIPTION OF THE DRAWINGS

FIG. 3 is a sample table from an exemplary endpoint notification database;

FIG. 4 is a sample table from an exemplary designee preference database; and

FIG. 5 is a sample table illustrating events that are recorded in accordance with the present invention.

DETAILED DESCRIPTION

Figure 1:
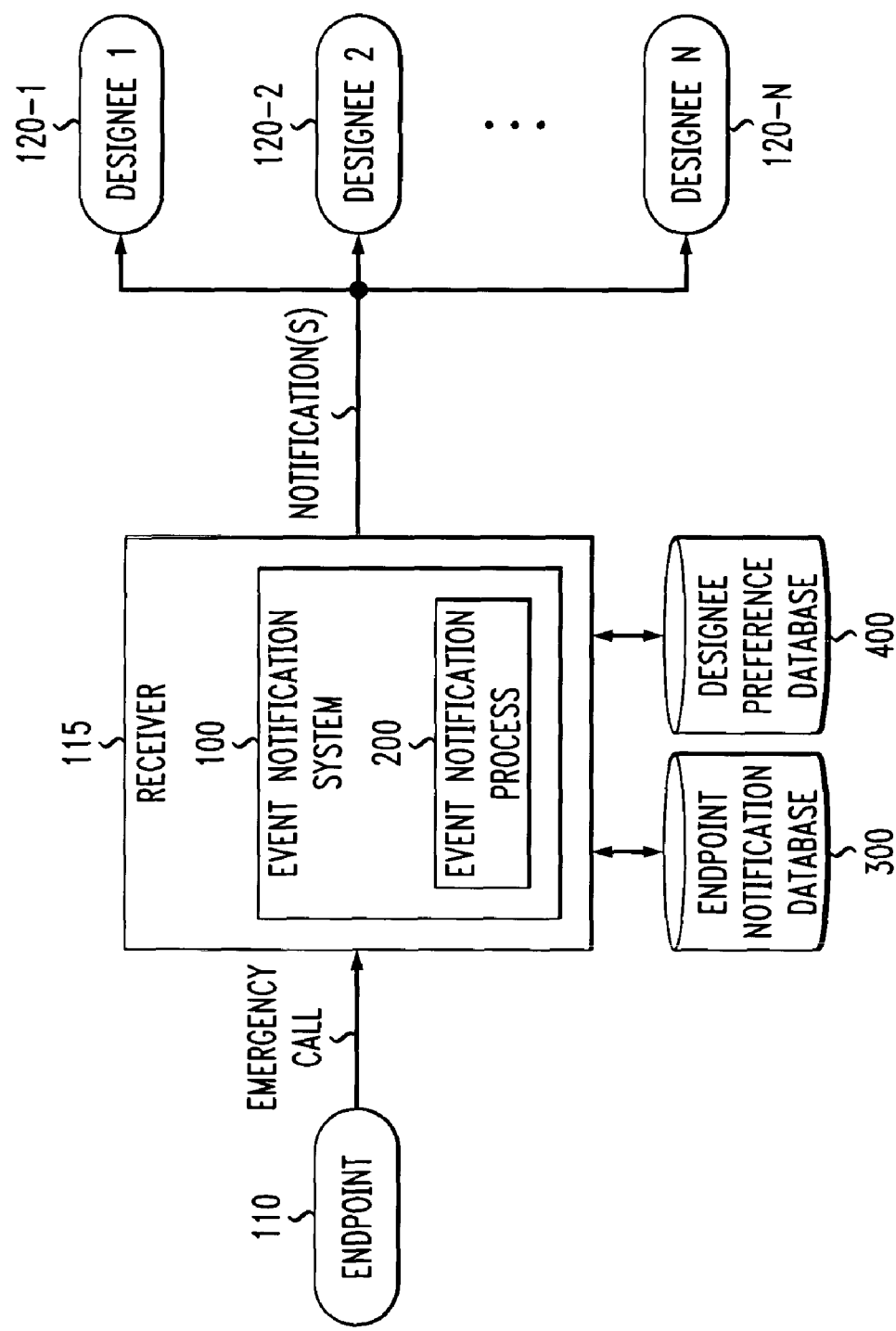
FIG. 1 illustrates an event notification system incorporating features of the present invention.

The present invention provides an event notification system 100, shown in FIG. 1, that notifies one or more designees 120-1 through 120-N, hereinafter, collectively referred to as designees 120, of an event or emergency that has been reported by an endpoint 110 (identified by a telephone number) to a receiver 115. The receiver 115 can be, for example, a Public Safety Answering Point (PSAP) that processes 911 calls. In the exemplary emergency response embodiment, the event notification system 100 can be implemented by the receiver 115 itself, as shown in FIG. 1, or by another entity, such as a telephone service provider. The designees 120 may be specific to the endpoint 110 and may be contacted by a number of different media, such as electronic mail, telephone, web page, pager or facsimile, or a combination of the foregoing, in one or more preferred human languages. The endpoint 110 may be embodied, for example, as any communication device, such as a telephone, cellular telephone, email-enabled personal computer or wireless personal digital assistant, or a medical emergency token that may be worn by a person and activated to send an alarm to a central monitoring station.

While the present invention is illustrated in an exemplary emergency response environment, the present invention may also be employed to notify designees 120 of an event that has been reported to a non-emergency telephone number, such as a help desk, as would be apparent to a person of ordinary skill in the art. For example, an account representative can be the designee that is notified when a particular customer or client places a telephone call to a help desk or customer service line to obtain assistance.

As shown in FIG. 1 and discussed further below in conjunction with FIG. 2, the event notification system 100 employs an event notification process 200 to implement features of the present invention. Generally, when a call is received by the receiver 115, the event notification system 100 obtains the telephone number of the endpoint 110 using the ANI information conveyed with the call. As discussed further below in conjunction with FIG. 3, the telephone number of the endpoint 110 can be used as an index into an endpoint notification database 300 to identify one or more designees 120 that should be notified when a call is received from this endpoint 110. The generated message and optionally the particular designees 120 that are notified can be based on information about the call, such as the nature of the emergency.

In one exemplary embodiment, the event notification system 100 employs a notification system to notify the designees 120, such as the notification system described in U.S. patent application Ser. No. 10/184,236, filed Jun. 26, 2002, entitled "Method and Apparatus for Automatic Notification and Response," incorporated by reference herein. Thus, the event notification process 200 generates a communication flow for each identified designee 120 in order to notify each designee 120 of the event or emergency. As discussed further below in conjunction with FIG. 4, the delivery preferences of each designee can be recorded in a designee preference database 400.

Generally, a communication flow is the path of a notification from the event notification system 100 to each designee 120. Communication flows are characterized by communication flow expressions, success specifications, communication flow rules and parameters. A communication flow identifies the specific designees 120 that are to receive the notice, as well as how, when and where each designee 120 shall receive the message in accordance with the specified preferences of each designee 120. Communication flow expressions can also specify what action to take when a particular designee fails to respond successfully to a notification request. For more details on communication flows and communication flow expressions, see U.S. patent application Ser. No. 10/184,236.

The event notification system 100 optionally obtains the responses of the designees 120, and records the status of the notification process. The communication flow can be specific to the target endpoint and the circumstances of the emergency call. The management of responses and status updates can be processed by a notification request manager, as described in U.S. patent application Ser. No. 10/184,236. Generally, the notification request manager tracks all the notification requests that have been submitted. The notification request manager can maintain a notification request database (not shown) that includes information about each notification request, and indicates the status of each request, such as pending, cancelled or completed. The notification request database can be maintained in memory or a persistent database in which the requests and their current state (including responses) can be stored. Among other functions, the notification request manager assigns a unique identifier to each notification request that can be used to identify the notification that a designee 120 should receive and the notification request to which a response applies. In addition, the notification request manager modifies requests, if necessary, to ensure that the responses are forwarded back to the event notification system 100. As previously indicated, communication flow expressions are used to specify the parameters of a given notification request. The notification request manager follows the directions of the communication flow in performing each media specific communication with a designee.

According to one aspect of the present invention, the event notification is triggered by a received call. Generally, whenever a telephone call is received from an endpoint 110 registered with the event notification system 100, the corresponding specified designees 120 are going to be notified of the event. In a further variation, the event notification can be triggered indirectly when a call is placed by a third party identifying the response address associated with an endpoint. For example, if a neighbor reports an emergency at a home across the street, the designees that have been specified for the home across the street should be notified.

The event notification system 100 thus employs personalized message delivery (designees receive messages when and how they want). The event notification system 100 can deliver notifications and collect responses in any one of a number of supported human languages and media formats, such as electronic mail, telephone, web page, pager or facsimile. In addition, the event notification system 100 provides centralized notification management for endpoints and designees, as well as response collation and status updating.

In one embodiment, messages are generated in each particular media format using XML request data that can be updated and can maintain a history of values with XML style sheets to dynamically render the content of the messages in each format. The media of the message can be tailored to the designee's needs and preferences at the time of the delivery, and the content of the message can be generated at the time of delivery so that it always contains the most up-to-date information. For example, many of the media contacts employed by the event notification system 100 can initially provide an indication to the designee that a notification message is available for the designee, such as a page indicating that the designee must call a designated telephone number to retrieve a notification message or an electronic mail message containing a hyperlink to a web page containing the notification message. The recipient thereafter accesses the notification message and is presented with the up-to-date version of the notification message at the time of the access. In this manner, the receiver 115 can update the notification message until the designee actually accesses the notification message.

Figure 2:
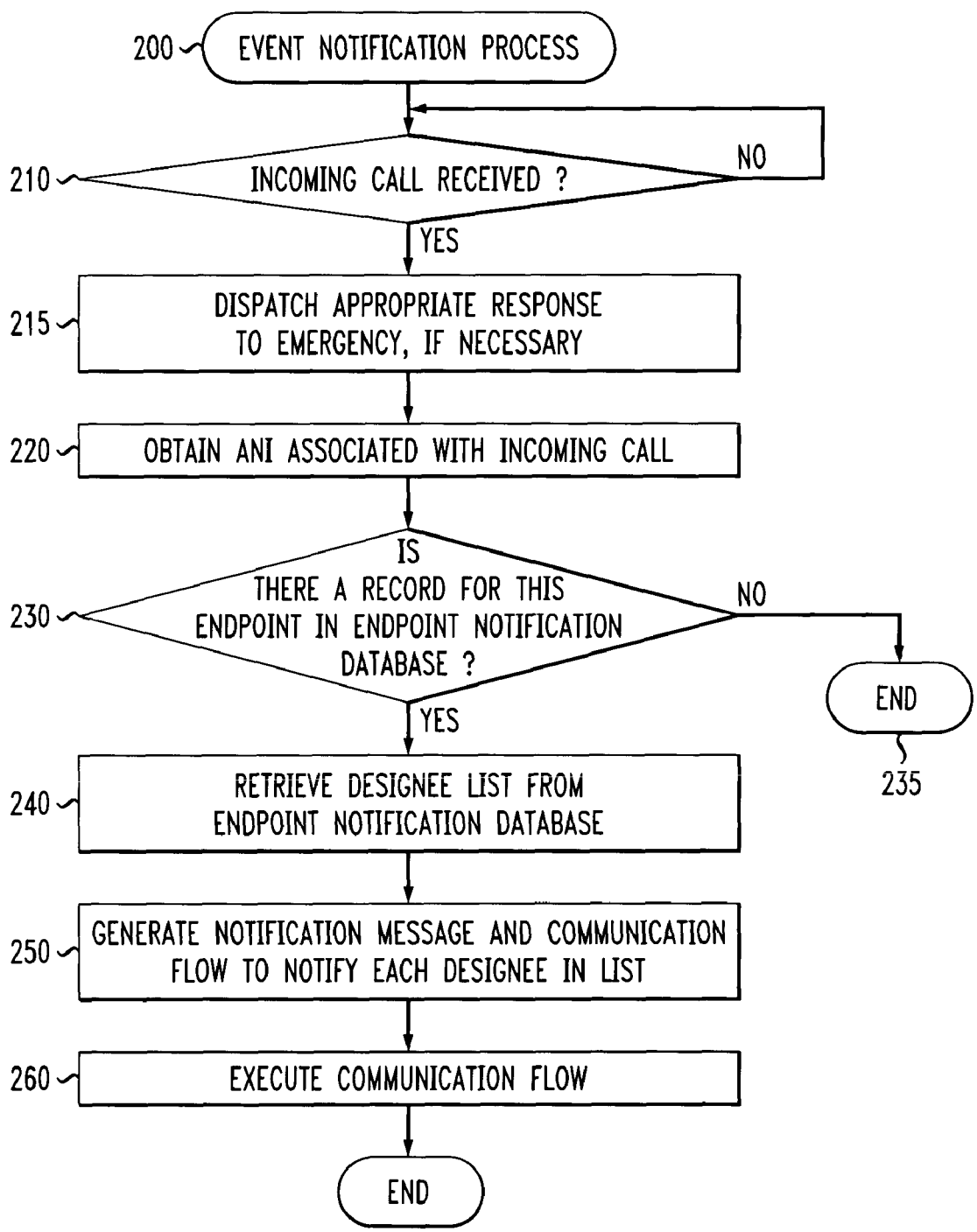
FIG. 2 is a flow chart illustrating an event notification process incorporating features of the present invention.

As previously indicated, the event notification system 100 employs an event notification process 200, shown in FIG. 2, to implement the notification features of the present invention. As shown in FIG. 2, the event notification process 200 is initiated during step 210 upon receipt of an incoming call. Once an incoming call is detected during step 210, the appropriate response to the emergency is dispatched during step 215, if necessary. For example, the appropriate police or medical personnel may be dispatched.

Thereafter, the ANI (or telephone number) associated with the incoming call is obtained during step 220. The ANI (or telephone number) of the endpoint (i.e., the calling party) is then used as an index into the endpoint notification database 300. It is noted that any identifier of an endpoint device, such as an email address, could be used instead of the ANI. A test is performed during step 230 to determine if there is a record in the endpoint notification database 300 corresponding to the telephone number of the calling part. If it is determined during step 230 that there is no record in the endpoint notification database 300 corresponding to this endpoint, then program control terminates during step 235.

If, however, it is determined during step 230 that there is a record in the endpoint notification database 300 corresponding to this endpoint, then the designee list associated with this endpoint is retrieved from the endpoint notification database 300 during step 240. A notification message that may optionally be tailored to include characteristics of the telephone call, such as the nature of the emergency, and a communication flow expression are generated during step 250 to notify each designee in the designee list. The notification message may indicate, for example, the date and time of the emergency call, the nature of the emergency, the emergency personnel that were dispatched (e.g., police and fire personnel) and a telephone number to call for further information. An exemplary communication flow for notifying designees of an emergency can be expressed as follows:

((Mother or Father) races Grandmother after +00:30.00) and Neighbor)

According to the above communication flow, the parents (mother or father or both) occupying a home are notified of any emergency at the home, in this case involving a child. It is assumed that the Grandmother lives far away. The family will contact her personally, if possible. The event notification system 100 will only contact the Grandmother if the Mother and the Father do not respond within 30 minutes. A neighbor is also contacted in parallel. The communication flow is then executed during step 260 in accordance with the teachings of U.S. patent application Ser. No. 10/184,236. Program control then terminates.

FIG. 3 is a sample table from an exemplary endpoint notification database 300. As shown in FIG. 3, the exemplary endpoint notification database 300 includes a plurality of records 305-315, each associated with a different endpoint. For each endpoint, identified by a telephone number in field 330, the endpoint notification database 300 records the corresponding address and distribution list in fields 340 and 350, respectively.

As previously indicated, communication flow expressions provide a flexible, general technique for specifying designees for a notification request and how to direct a communication in response to the replies received from designees. In an exemplary implementation, a designee preference database 400, shown in FIG. 4, can be embodied as a Lightweight Directory Access Protocol (LDAP) directory, described, for example, in M. Wahl et al., "Lightweight Directory Access Protocol (v3)," RFC 2251 (December 1997), incorporated by reference herein. The designee preference database 400 holds objects that describe the designees that can appear in a communication flow expression. As shown in FIG. 4, the exemplary designee preference database 400 includes a plurality of records 405-420, each associated with a different designee.

For each designee identified in field 430, the designee preference database 400 identifies the designee type in field 440 and the personal communication flow defined for the designee in field 450. The types of designee that may appear in field 440 are a person, a role, an application, a device, a named communication flow or a method for contacting an individual designee. While a person, role or named communication flow object can specify a communication flow expression for contacting designees, the method for contacting an individual designee or an application (or media contact object) is a terminal object in the translation of designee names (i.e., the object is not translated further in the directory). The object includes attributes that are important for reaching the individual or application that may act as an agent for the individual; specifically, the address, protocol, timeout and retry intervals for making contact.

According to a concept referred to as dynamic communication flow expression substitution, the binding of designee names to information in the designee preference database 400 is delayed until the time of contact. Thus, the late binding aspect implies that a designee described as a role, such as the CEO of a company, can change until the system 100 begins its attempt to notify the CEO. In addition, the personal communication flow of a designee, such as the office phone number, can change to an away phone during a trip and still be used successfully by a request submitted before the trip began.

When a designee is contacted by a media contact, the designee can request that a different communication flow expression be substituted for his or her expression in the communication flow. This allows the designee to delegate tasks dynamically to more appropriate designees. It also allows designees to delay the task by substituting into the communication flow a communication flow expression that has a delay clause, for example, "Joann after +04:00," which generates a reminder to process the request after a four hour delay. FIG. 4 provides a number of exemplary objects in the exemplary designee preference database 400 that illustrate the different types of designees. A discussion of the exemplary primitives employed in the designee preference database 400 is discussed in U.S. patent application Ser. No. 10/184,236.

FIG. 5 is a sample table 500 illustrating events that are recorded in accordance with the present invention. As shown in FIG. 5, an emergency call is received during event 505. The ANI associated with the received emergency call is employed to identify the caller, Liz Johnson during event 510 and the appropriate response is deployed during events 515 and 520. Thereafter, the event notification system 100 generates and processes a communication flow in accordance with the present invention during events 525 and 530. Pat and Joann are notified in accordance with their specified preferences (pager and cell phone/email, respectively) during events 535 and 540 according to the exemplary communication flow. A status update is received during event 555 indicating medical conditions of the caller. The recipient Joann responds during event 570 indicating that she will go to the hospital.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
   receiving, at an event notification system, a communication;
   generating, at the event notification system, a notification message, wherein the notification message includes information about a response to the communication, wherein the response is dispatched prior to the generation of the notification message;
   generating, at the event notification system, a communication flow expression which contains at least one instruction concerning a transmission of the notification message, wherein the communication flow expression specifies a first recipient for the notification message; and
   executing the communication flow expression, at the event notification system, and sending the notification message from the event notification system to the first recipient.

2. The method of claim 1, wherein the notification message is provided to the first recipient in accordance with preference information for the first recipient.

3. The method of claim 2, wherein the preference information includes at least one media preference.

4. The method of claim 2, wherein the preference information includes at least one human language type preference.

5. The method of claim 1, wherein the notification message is generated in response to the received communication being placed to a specified telephone number.

6. The method of claim 1, wherein the notification message notifies the first recipient of an emergency that has been reported to the event notification system.

7. The method of claim 1, wherein the notification message notifies the first recipient of a telephone call that has been placed to a help desk.

8. The method of claim 1, further comprising the step of receiving, at the event notification system, at least one response to the notification message.

9. The method of claim 1, further comprising the step of receiving, at the event notification system, at least one status update from a designated person.

10. The method of claim 1, further comprising the step of dispatching a response to the communication.

11. The method of claim 10, further comprising the step of receiving, at the event notification system, at least one status update from a person associated with the response.

12. The method of claim 1, further comprising the step of notifying the first recipient of a status update.

13. The method of claim 1, wherein the communication flow expression describes whether a second recipient is notified based on a response from the first recipient.

14. An apparatus comprising:
    a memory; and
    at least one processor, coupled to the memory, operative to:
    receive a communication;
    generate a communication flow expression when the communication is received, wherein the communication flow expression contains at least one instruction concerning a transmission of a notification message, wherein the communication flow expression contains an indication of a time of contact and an identification of a recipient, and wherein the time of contact is a time at which the notification message is set to be transmitted, and wherein the time of contact is in the future relative to the time at which the communication flow expression is generated; and
    execute the communication flow expression at the time of contact and send the notification message to the recipient as a result of the execution, wherein the execution action comprises substituting the identification of the recipient with contact information for the recipient.

15. The apparatus of claim 14, wherein the notification message is provided to the recipient in accordance with preference information specified by the recipient.

16. The apparatus of claim 14, wherein the notification message notifies the recipient of a reported emergency.

17. The apparatus of claim 14, wherein the notification message notifies the recipient of a telephone call that has been placed to a help desk.

18. The apparatus of claim 14, wherein the processor is further configured to receive at least one response to the notification message.

19. The apparatus of claim 14, wherein the processor is further configured to receive at least one status update.

20. The apparatus of claim 14, wherein the processor is further configured to dispatch a response to the communication.

21. An article of manufacture for providing a notification of an event, the article of manufacture comprising a machine readable and recordable medium containing one or more programs which when executed implement the steps of:
    receiving a communication;
    generating a notification message, wherein the notification message includes information about a response to the communication, wherein the response is dispatched prior to the generation of the notification message;
    generating a communication flow expression which contains at least one instruction concerning a transmission of the notification message; and
    executing the communication flow expression and sending the notification message from the event notification system to a recipient that is identified in the communication flow expression.

* * * * *